R. C. BRADLEY.
LIQUID DISPENSING APPARATUS.
APPLICATION FILED FEB. 2, 1914.
1,206,507.
Patented Nov. 28, 1916.
4 SHEETS—SHEET 3.
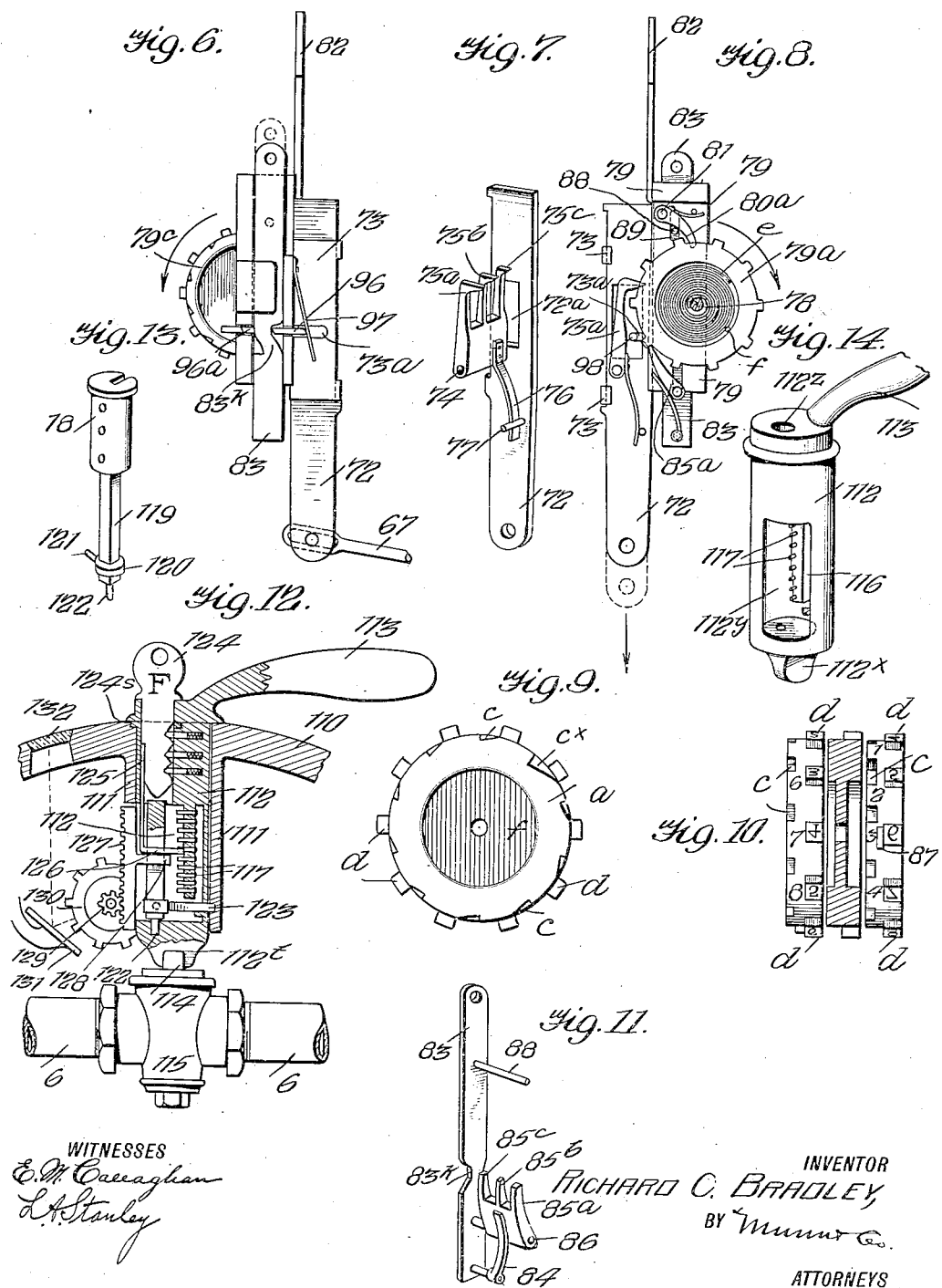

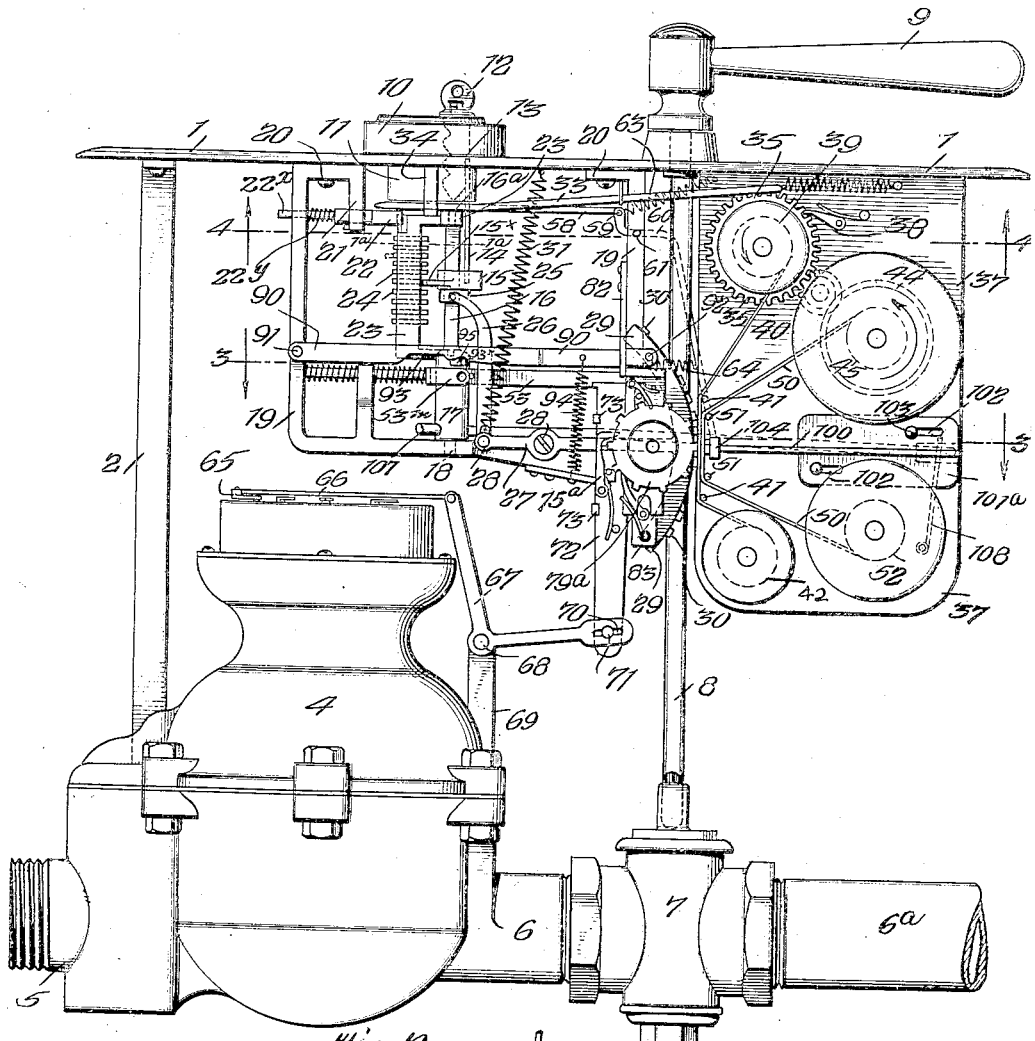
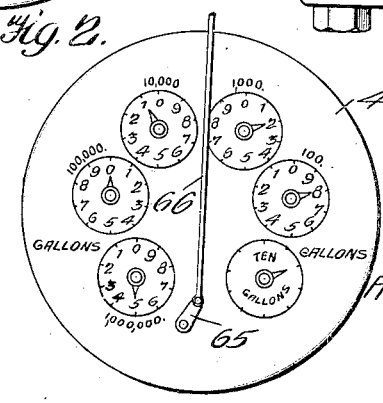
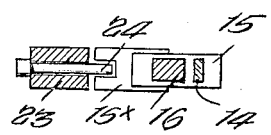

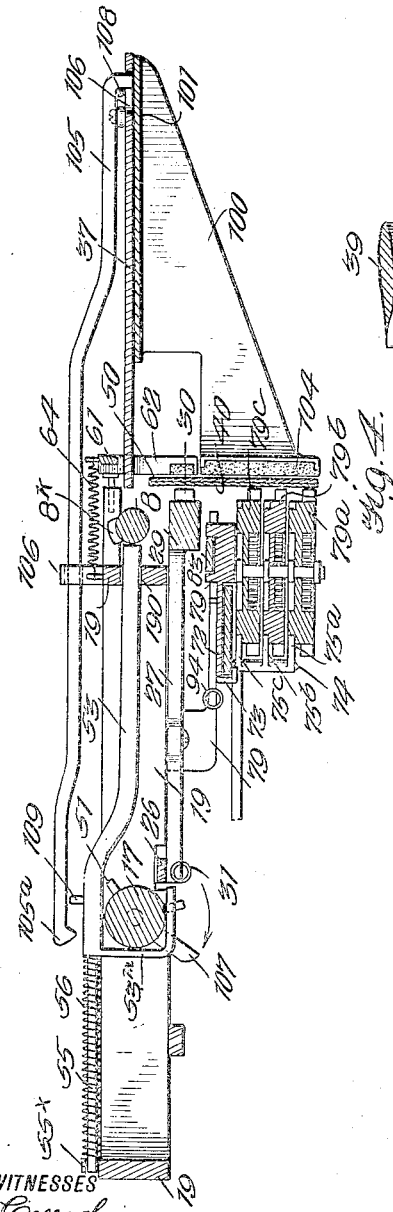

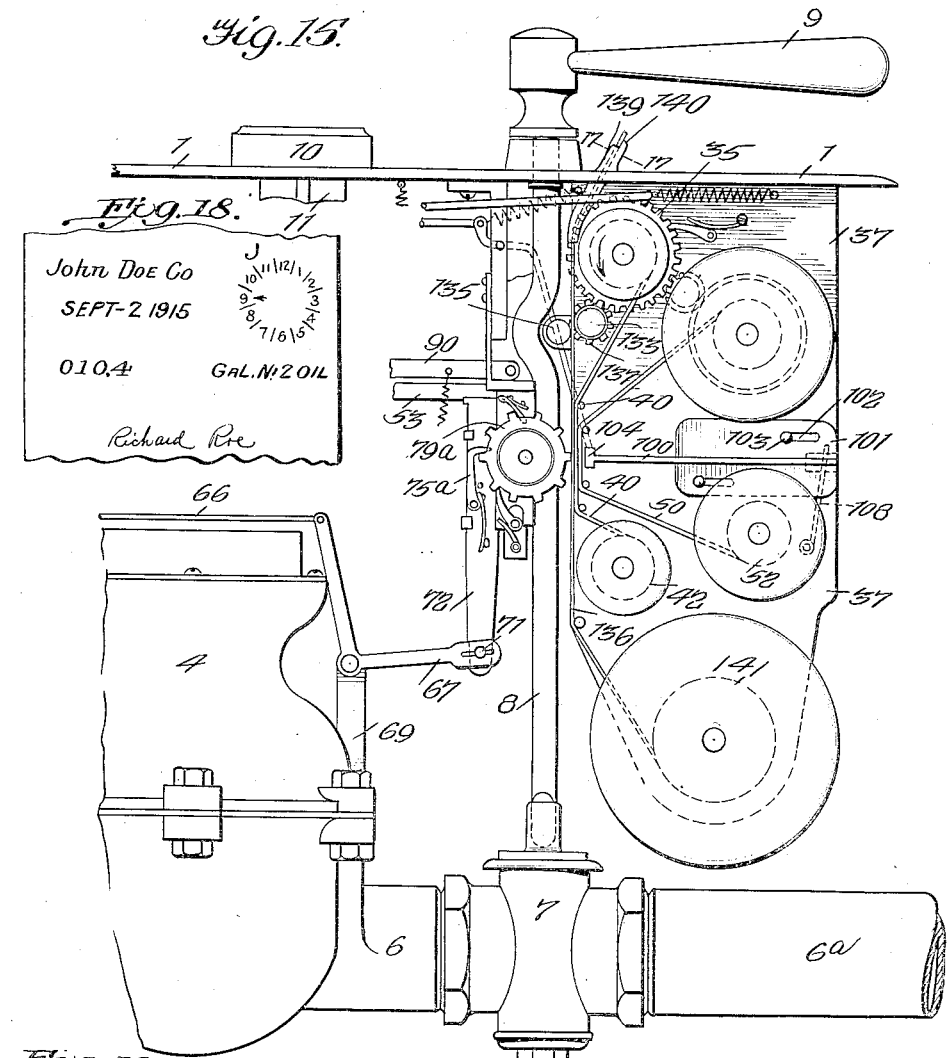

UNITED STATES PATENT OFFICE.

RICHARD C. BRADLEY, OF SHREVEPORT, LOUISIANA, ASSIGNOR OF ONE-FOURTH TO LEE KINNEBREW AND ONE-FOURTH TO J. MALLY EASTHAM, BOTH OF SHREVEPORT, LOUISIANA, AND ONE-FOURTH TO C. FRANK IRELAND, OF HOUSTON, TEXAS.

LIQUID-DISPENSING APPARATUS.

1,206,507.     Specification of Letters Patent.     Patented Nov. 28, 1916.

Application filed February 2, 1914. Serial No. 815,951.

*To all whom it may concern:*

Be it known that I, RICHARD C. BRADLEY, a citizen of the United States, and a resident of Shreveport, in the parish of Caddo and State of Louisiana, have made certain new and useful Improvements in Liquid-Dispensing Apparatus, of which the following is a specification.

My invention relates to improvements in liquid dispensing apparatuses, and it consists in the combinations, constructions, and arrangements herein described and claimed.

An object of my invention is to provide a device for dispensing liquids, and for recording and registering the amount of the liquid dispensed and the party to whom it is delivered.

A further object of my invention is to provide a device of the type described having a novel form of locking mechanism which normally keeps the supply valve from being opened, but which may be operated to permit the opening of the supply valve at will.

A further object of my invention is to provide a novel form of recording mechanism in which there are a series of number wheels that are actuated by the meter which measures the flow of the liquid.

A further object of my invention is to provide means for preventing the withdrawal of the key from the lock until after the recording mechanism is operated.

A further object of my invention is to provide means for automatically delivering a printed receipt or ticket bearing a record of the amount of liquid drawn and also of the character indicating to whom the liquid was delivered.

A further object of my invention is to provide a device of the type described having novel means for preventing the operation of the device by any particular party without interfering with the operation of the device by other parties.

Other objects and advantages will appear in the following specification, and the novel features of the device will be particularly pointed out in the appended claims.

My invention is illustrated in the accompanying drawings forming part of this application in which—

Figure 1 is a side view of the device, Fig. 1ª is a section on the line 1ª—1ª of Fig. 1. Fig. 2 is a face view of the dial of the meter mechanism, Fig. 3 is a section along the line 3—3 of Fig. 1, looking in the direction of the arrows, Fig. 4 is a section along the line 4—4 of Fig. 1, looking upwardly in the direction of the arrows, Fig. 5 is a perspective view of a portion of the valve locking mechanism, Fig. 6 is a detail view of a portion of the recording mechanism, Fig. 7 is a perspective view showing the details for operating the number wheels of the recording mechanism, Fig. 8 is a detail view showing the relation of the number wheels to their actuating pawls, Fig. 9 is a detail view of one of the number wheels looking from the opposite side of that shown in Fig. 8, Fig. 10 is an edge view of certain of the number wheels, one of the number wheels being shown in section, Fig. 11 is a perspective view of the spring-pressed stop mechanism for the number wheels, Fig. 12 is a sectional view through a modified form of the locking mechanism, Fig. 13 is a perspective view of a portion of the locking mechanism shown in Fig. 12, Fig. 14 is another perspective view of the locking mechanism shown in Fig. 12, Fig. 15 is a view showing a modified form in which there is a receipt delivering mechanism, Fig. 16 is an enlarged plan view of the rollers which actuate the ticket strip, the strip being shown in section, and Fig. 17 is a detail view showing the cutting edge of the delivery tube of the ticket or receipt strip, Fig. 18 is a face view of a sample record made by the device; Figs. 19 and 20 are views of keys which operate the device.

The apparatus which forms the subject of the present invention is primarily designed to be located at oil supply stations for recording the amount of oil supplied to the different tank wagons before they start out on their different routes. It is obvious, however, that the device might be used for recording the amount of any suitable liquid which is to be sold or otherwise disposed of.

In carrying out my invention I make use of a key plate 1 which is securely fastened by means of cross members such as those shown at 2 and 3 to the casing of a liquid meter mechanism 4. The latter may be of any suitable type such as an ordinary water meter. The particular construction of the meter itself forms no part of the present invention except in so far as it coöperates with the novel mechanism to be described. On one side of the meter 4 is an inlet pipe 5 which may communicate with a source of supply (not shown). On the other side is an outlet pipe 6 which is provided with a valve 7 by means of which the flow of the liquid through the meter 4 may be controlled. Extending from the valve 7 through the plate 1 is a valve stem 8 which is provided with an operating handle 9.

Secured on the outer side of the plate 1 is a portion 10 of a lock such as a "Yale" lock, a reduced integral portion 11 of the lock extending through an opening in the plate. The lock is provided with a key 12 of the ordinary type. This key, however, has a shoulder 13, which is arranged to engage the end of an arm 14, which extends into the lock member 11, and which is connected with a slidable lug 15, which is mounted on the squared portion 16 of a shaft, which is rigidly connected at its upper end with the rotatable barrel of the lock and which is journaled at its lower end in the upper end of a cylindrical member 17, having a short stub shaft 18 rotatably mounted in a frame member 19. The frame 19, as will be observed from Fig. 1 is substantially U-shaped, and is connected to the plate 1 at 20. One side of the frame 19 is bent downwardly, as shown at 21 to form a bearing for a slidable stop member 22. The function of this stop member will be explained later.

A bar 23, which is parallel with the rod 16, is rigidly secured at its lower end to the cylinder 17 and is loosely secured to the cylindrical reduced portion 16$^a$ of the rod 16 by means of a collar 23. This bar bears a series of slidable pins 24 which normally project into the path of a slotted extension 15$^x$ carried by the lug 15 (see Figs. 1 and 1$^a$). These pins may be withdrawn from the path of the lug 15 at will. Two of such pins, to wit; the third pin from the top of Fig. 1 and the eighth pin from the top are shown withdrawn, so as not to be engaged by the extension 15$^x$ of the lug 15 when the latter is rotated.

Disposed beneath the lug 15 and slidable on the rod 16 is a collar 25, which is pivotally connected by means of a curved arm 26 with a lever 27, this lever having a pivotal connection 28 with the arm 26. The fulcrum of the lever 27 is at 28, this fulcrum being on the frame 19. The opposite end of the lever 27 is provided with a type bar 29 formed on a curve whose center is the fulcrum of the lever, and which bears type 30. A spiral spring 31 is secured at its upper end to the plate 1 and at its lower end to the lever 27.

It is obvious from the construction described that when a key such as that shown at 12 is inserted in lock and pushed forwardly the shoulder 13 of the key will engage the small slidable arm or bar 14, and will push the lug 15 downwardly. This will cause a downward movement of the collar 25 and hence a movement of the lever 27 through the medium of the arm 26. The type bar 29 will thus be shifted in accordance with the movement of the lug 15 and the movement of the latter is, of course, gaged by the position of the shoulder 13 of the key 12.

As stated before the device is designed to be used by a number of persons and each person has a key having a shoulder 13 disposed at a predetermined position. These keys are preferably given a serial letter such as A, B, C, D, etc. The key A will push the lug 15 downwardly a short distance, the key B downwardly a further distance, the key F as illustrated in the drawing to a still further distance. This will bring the type 30 which bears the same letter as the key to the printing position for recording the serial letter of the party who uses the key. When the key is withdrawn the spring 31 will, of course, restore the type bar 29 to its normal position.

The keys are so constructed that each key will force the lug 15 downwardly so as to bring its slotted extension 15$^x$ opposite one of the pins 24 (see Figs. 1 and 1$^a$). Now when the shaft 16 is rotated the parallel bar 23 will also be rotated and hence the cylinder 17. The normal position of the bar 23 is that shown in Fig. 4. It is held in this position by means of the head or stop member 22 which is carried by a slidable shaft 22$^x$. The latter is provided with a spring 22$^y$ which tends to force the stop member against the bar 23. When the latter is turned the stop member is forced rearwardly against the tension of the spring 22$^y$. The stop member has a cam surface 22$^z$ (see Fig. 4) which will permit it to be moved against the tension of the spring 22$^y$ to permit the bar 23 to resume its normal position when it has been turned by the key. Disposed above the upper end of the bar 23 is an arm 32 (see Fig. 4, which, it will be remembered is a section looking upward from below). This arm is rigidly secured to the shaft 16 and turns with it. The end of the arm 32 is adapted to engage the laterally extending end of a rod 33, which is slidable in a guide member 34, and whose opposite end is bent laterally so as to engage the teeth of a gear wheel 35. The rod 33 in fact acts as a pawl and is normally under the tension of a spring 36, which is secured to a plate 37 upon which the gear 35 is mounted. Normally the rod 33 is held in the position shown in Fig. 4, but when the rod 16 is turned it will carry the arm 32 around with it, and this will permit the rod 33 to retract under the tension of the spring 36, so as to ride over the teeth of the gear 35 which in this instance acts as a ratchet wheel also. When the rod 16 is turned into its normal position it is obvious that the gear or ratchet 35 will be rotated. The ratchet is prevented from backward movement by means of a spring-pressed pawl 38.

The rotation of the gear 35 turns a reel 39 bearing an inking ribbon 40. The latter passes downwardly over guide pins 41 and is wound around another reel 42 carried by the plate 37. The gear 35 engages a gear 43 which in turn meshes with a gear 44 upon whose shaft is mounted a reel 45 bearing a record strip 50 which passes over guides 51 and thence around a reel 52 also mounted on the plate 37. It will thus be seen that when the gear 35 is rotated in the direction shown by the arrow in Fig. 1 both the ribbon and the record strip will be moved forwardly past the types 30 on the type segment 29.

As previously stated the cylinder 17 (see Fig. 1) is revolved whenever the bar 23 is swung around by the engagement of the slotted extension 15$^x$. As will be seen from Figs. 1 and 3 a rod 53 is provided, one end of which projects through an opening 19$^o$ in the frame member 19 and the other end of which has an integral L-shaped member 53$^m$ which partially surrounds the cylinder 17. A rod 55 is secured to the rod 53 and extends through a bearing 55$^x$ on the opposite arm of the U-shaped frame 19. A spring 56 normally presses the L-shaped member 53$^m$ toward the cylinder 17. The opposite end of the bar 53 extends normally in the path of a lug 8$^k$ on the valve stem 8, and this prevents the rotation of the valve. When, however, the cylinder 17 is rotated, a pin 57 on the cylinder 17, will engage in an opening 53$^t$ in the L-shaped extension 53$^m$ of the bar 53 and will force the bar 53 against the tension of the spring 55, so as to withdraw the end of the bar 53 from the path of the lug 8$^k$, thereby permitting the rotation of the valve stem 8. On the reverse movement of the cylinder 17 the spring 55 will push the rod into the path of the lug 8$^k$ so as to prevent the valve from being operated. The key cannot be removed until the valve is in a closed position, and since the lug 8$^k$ is in the path of the bar 53 the key cannot be removed until the valve stem is placed in the closed position.

Referring again to the arm 32, which is secured to the rod 16, it will be seen from Fig. 4 that the hub 32$^h$ of this arm has a shoulder 32$^s$ which is arranged to engage the head 58$^h$ of a bar 58, which is bent as shown in Fig. 4, and which is pivotally connected at 59 with a bell-crank lever 60, which is mounted at 61, and which bears a laterally extending platen 62 disposed on the opposite side of the ribbon 40 and the record strip 50 from the type 30 on the type segment 29. Now the rotation of the arm 32 will cause the shoulder 32$^h$ to engage the head 32$^s$ so as to move the rod 58, thus moving the bell-crank lever so as to bring the platen 62 away from the ribbon and recording strip. As soon as the shoulder 32$^s$ leaves the head 58$^h$ the rod 58 springs back to its normal position under the influence of a pair of spiral springs which are attached to the bell-crank lever 60 on opposite sides of its fulcrum. These spiral springs are indicated at 63 and 64 respectively. The impact of the platen 62 will print the serial number of the key on the record strip.

I will now show how the passage of the liquid will cause the operation of the recording mechanism to indicate the amount of liquid drawn off. Referring to Fig. 1 it will be seen that I have provided an arm 65 which is operated by the meter mechanism so as to rotate. This arm is connected by means of a link 66 with a bell-crank lever 67 pivoted at 68 on an upright 69 secured to the casing of the meter 4. One arm of the bell-crank lever is slotted as shown at 70 and a pin 71 projects through this slot. The pin 71 is carried at the lower end of a member 72 such as a bar or plate which is vertically slidable in guides 73. This vertically slidable bar bears a laterally extending shaft 74 upon which is mounted a number of pawls such as those shown at 75$^a$, 75$^b$ and 75$^c$ in Fig. 7. It will be observed that the pawl 75$^a$ is longer than the pawl 75$^b$ and that the pawl 75$^b$ is longer than the pawl 75$^c$. These pawls are connected together and are normally pressed upon by a spring 76, which bears on a pin 77 carried by the member 72.

Arranged to be driven by the pawls 75$^a$, 75$^b$ and 75$^c$ are three ratchet wheels like that shown in Fig. 9. A description of one of these wheels will suffice since they are all alike. Each wheel has a body portion $a$ provided with a central recess $b$ on one side and having on the same side a series of notches $c$ extending inwardly. These notches are arranged around the periphery of the wheel. One of the notches $C^x$ is of extra depth, as will be seen from Fig. 9. There are ten of these notches in all. Arranged on the exterior of the wheel are types $d$ which correspond in number to the notches. On the opposite side of the wheel is a recess containing a spring $e$. This spring is fastened at one end to a shaft 78 which is mounted on a bracket 79 secured to the frame member 19. The opposite end of the spring $e$ is not rigidly secured to the interior wall of the recess formed in the wheel, but is in frictional contact with the wheel, as clearly shown in Fig. 8. A pin or lug $f$ is carried by each wheel within the recess in which the spring is disposed. In the drawings I have shown three of these number wheels $79^a$, $79^b$ and $79^c$ which are associated with the pawls $75^a$, $75^b$ and $75^c$ respectively. At each revolution of the crank arm 65 (see Figs. 1 and 2) on the meter 4 the bell-crank lever 67 is reciprocated and the bar 72 is reciprocated vertically. At the first upward movement of the bar 72 the pawl $75^a$ carried thereby will engage in a notch $c$ of the wheel $79^a$ and will turn the latter one-tenth of a revolution, thereby bringing the adjacent one of the raised types into printing position. The pawls $75^b$ and $75^c$ will not be in engagement with their respective wheels because they are too short. As the meter mechanism continues to work and the rod 72 is reciprocated the number wheel $79^a$ is turned. This wheel is designed to record amounts which are one-tenth of those recorded by the wheel $75^b$, the latter recording one-tenth of the amounts recorded by the wheel $75^c$. Thus the wheel $75^a$ may record units, the wheel $75^b$ tens, and the wheel $75^c$ hundreds. When the wheel $79^a$ has made one revolution the pawl $75^a$ will drop into the deep slot such as that shown at $C^x$ in Fig. 9. This will permit the second pawl $75^b$ to engage in the first slot of the wheel $79^b$ and the subsequent upward movement of the member 72 will turn the wheel $75^b$ one-tenth of a revolution. When the wheel $79^b$ has made one revolution the pawl $75^b$ will drop into a deep slot similar to the slots $C^x$ in Fig. 9, thereby bringing the pawl $75^c$ into engagement with one of the slots $c$ of the wheel $79^c$. In order to prevent any rearward movement of the wheels I provide a spring-pressed pawl such as that shown at $80^a$ in Fig. 8 for each of the wheels. These pawls are mounted on a common shaft 81 which is carried by the downwardly extending portion of the bracket 79 which is held at its upper end by means of a brace member 82. As will be seen from Fig. 3 the bracket 79 forms a guide member for the slidable bar 83 which is shown in perspective in Fig. 11. This bar bears at its lower end a leaf spring 84 which engages three stop members $85^a$, $85^b$, and $85^c$ mounted on a common shaft 86. These stop members are designed to engage lugs such as that shown at 87 in Fig. 10, disposed between the notches $c$ on one edge of the wheel and the type $d$ on the other edge. It will be understood that the stop members $85^a$, $85^b$ and $85^c$ do not engage either the notches $c$ or the teeth $d$, but rather slide on the face of the wheel until they come in contact with the stop member 87. This stop member is placed on the periphery of the wheel at a point diametrically opposite from the type which designates zero, so that when the wheels are in such a position that the stop members $85^a$, $85^b$ and $85^c$ engage their respective lugs 87 each wheel will read zero on its diametrically opposite portion. The bar 83 also bears a pin 88 which projects through a slot 89 in the plate 79 just underneath the pawls $80^a$, $80^b$ and $80^c$.

Referring now to Fig. 1 I have shown a lever 90 which is pivoted at 91 on the frame 19, and whose opposite end is pivotally connected at 92 to the upper end of the slidable bar 83. The lever 90 is provided with recesses 93 and $93^x$ on its under side. It is normally held in a lower position by the tension of a spring 94. Also when the cylinder 17 is turned so as to bring the pin 95 into the recess 93 the lever 90 is forced downwardly by means of the spring and carries with it the slidable bar 83. This permits the dogs $80^a$, $80^b$, etc., to engage their respective number wheels to prevent the backward movement thereof. During the reverse movement of the cylinder 17, $i.\,e.$, when the key is being turned back to its normal position in order to withdraw the same, the lever 90 will be momentarily forced upwardly by the pin 95 whereupon the dogs $80^a$, etc., will be withdrawn and the number wheels will be rotated in the opposite direction of that in Fig. 8 until the stop members 87 engage the spring-pressed stop members $85^a$, etc. In this connection it may be noted that the number wheels may be rotated in the direction shown by the arrow in Fig. 8 any definite number of times, since the coil spring $e$ will slip, but when the dogs $80^a$, etc., are withdrawn the rearward movement will take place as described. It will be understood, of course, that the release of the dogs $80^a$, etc., is effected by the upward movement of the pin 88 which is carried by the bar 83. It will be further understood that during the movement of the bar 83 the pawls $75^a$, $75^b$ and $75^c$ must be forced out of the way of the number wheels in order to permit the reverse movement of the wheels. To this end the plate or bar 83 is provided with a cam portion $83^k$ (see Figs. 6 and 11) which actuates a slidable plate 96 (see Fig. 6) having an opening $96^a$ through which the plate 83 extends. The plate 96 is normally pressed upon by a spring 97 and bears a pin 98 (see Fig. 8) which extends through an opening $73^a$ in the back of the guide plate 73 (see Fig. 6) thence through an opening $72^a$ in the slidable member 72 and in operative relation with the pawls $75^a$, etc., as shown in Fig. 8. In the normal position of the apparatus the pawls $75^a$, etc., are in engagement with the number wheels as shown in Fig. 8, but when the plate 82 is forced upwardly by the movement of the lever 90 as described then the plate 96 (see Fig. 6) will be moved by the cam portion $83^k$ of the plate 83 so as to bring the pin 98 (see Fig. 8) into engagement with the pawls 75ª, etc., thereby freeing them from the wheels and permitting the return of the latter to their normal positions under the influence of the springs *e*. In order to print and record the amount of the liquid drawn off, I provide a plate 100 which is secured to a slidable plate 101ª having slots 102 for the reception of pins 103 carried by the supporting plate 37 (see Fig. 1). It will be understood that the plate 100 is slidable toward and away from the number wheels. It bears a platen 104 which is of sufficient extent (see Fig. 3) to cause the imprint of the types of the number wheels upon the record strip. The plate 101 is connected by a rod 105 whose end is bent laterally and passes through an opening 106 in the supporting plate 37. The rod 105 passes through a guide member 106 secured to the frame 19 (see Fig. 3) and terminates in a head or hook 105ª. This hook is normally in the path of an arm 107 carried by the cylinder 17, the arm having a curved end portion, as shown in Fig. 3. The normal position of the arm is that shown in Fig. 3, but when the key is turned to permit the unlocking of the valve 7 the arm will be swung around so as to engage the hook 105ª. A spring 108 which is secured to the casing 37 keeps the arm 105 and the plate 101 in the position shown in Fig. 3, but when the key is turned in the reverse direction, *i. e.*, to withdraw it from the lock, the arm 105 is pulled forward by the arm 107 so that the plate 101 and the arm 105 are moved forward, thus bringing the platen 104 into engagement with the record strip 50, so as to press the latter and the ribbon against the types of the number wheels. A further revolution of the cylinder 17 will cause the disengagement of the arm 107 from the hook 105ª, since the pin 109 (see Fig. 3) will prevent the hook 105ª from following the arm 107 around. When the hook 105ª has been released from the arm 107, the spring 108 will cause the retraction of the platen 104 and the return of the parts to their normal position.

In Fig. 12 I have shown a modified form of the device in which there is a curved casing 110 having an integral cylindrical lock member 111 extending inwardly therefrom. Within the lock member 111 is disposed a rotatable cylinder 112 like that shown in Fig. 14. The top part of this cylinder has an integral handle 113 and the bottom portion has an extension 112ˣ arranged to engage the short valve stem 114 of a valve 115 which controls the supply pipe 6. The cylinder 112 is provided with a recess 112ʸ (see Fig. 14) and has a depending post 116 having slidable stop members 117 similar to the stop members 24 in Fig. 1. The cylinder 112 has a cylindrical opening 112ᶻ (see Fig. 14) arranged to receive a barrel 118 like that shown in Fig. 13 having a stem 119 provided with a collar 120 bearing a laterally extending pin 121. The lower part of the stem 119 is provided with a reduced portion 122 which is journaled in an opening 112ᵗ (see Fig. 14) in the extension 112ˣ. A slidable locking member 123 is arranged to be engaged by the pin 121 when the stem 119 is rotated so as to withdraw the locking member from the cylindrical lock portion 111, thereby permitting the rotation of the cylinder 112. This form of the device, as the one shown in connection with the previous figures has a key 124 having a shoulder 124ˢ arranged to engage a slidable rod 125 which is attached to a lug 126 slidable on the stem 119 and adapted to be brought into registration with one of the pins 117. A rack 127 is provided with an arm 128 which is also arranged to be engaged by the lug 126. The rack is in engagement with the gear 129 on the shaft of a number wheel 130. A mirror 131 is disposed in such a position as to reflect the position of the number wheel 130 upwardly through a glazed opening 132 in the casing 110. In this form of the device the key is inserted in the lock and pushed down as far as it will go, carrying with it the rod 125 and the lug 126. This pushes the rack downwardly and brings the number wheel to a position corresponding with the serial letter of the key used. The key is now rotated and the rotation of the stem causes the immediate withdrawal of the locking member 123. The cylinder 112 may now be rotated by means of the handle 113 thus opening the valve 115. On the reverse movement of the handle and then of the key, preparatory to withdrawing the latter, the latch member 123 again locks the cylinder 112, so as to prevent rotation of the cylinder, and hence the valve 115 cannot be opened until the key is again inserted and turned as described.

In Figs. 15, 16 and 17 I have shown a modified form of the device in which the gear 35 engages a gear 133 which in turn drives a gear 134 on the shaft of a roller 135 (see Fig. 16). The latter is disposed on the opposite side of a flexible ticket or receipt strip 136 from a roller 137, both of these rollers 135 and 137 frictionally engaging the strip 136. The ticket strip is designed to extend through a delivery tube 139 which projects through the plate 1, and which is provided with a serrated edge 140 (see Fig. 17) for tearing off a portion of the strip. A reel 141 is provided around which the ticket strip 136 is wound. This passes upwardly over guides 142 between the types on the number wheel and on the segment and the two platens. It is obvious that at every movement of the gear 35 in the direction shown by the arrow in Fig. 15 the ticket strip is fed upwardly where it may be grasped and torn off on the serrated edge 140.

From the foregoing description of the various parts of the device the operation thereof may be readily understood. When it is desired to prevent the use of a key, as for instance where the key should be lost and might be used by some person other than the party to whom it rightfully belongs, the pin 24, which corresponds to the serial letter of the key is withdrawn, as shown in Fig. 1, out of the path of the extension 15<sup>x</sup>, thereby preventing the operation of the device, in as far as the drawing off of the liquid is concerned and the registering of any amount of the same. The insertion of the key, of course, will bring the printing segment to the position corresponding with the serial letter of the key and the rotation of the key will cause the printing of this serial number by the actuation of the bell-crank lever 60 through the medium of the rod 58 in the manner described. It therefore follows that a record is made of the serial letter of the key when any attempt is made to operate the device even if no liquid is withdrawn. It will be further observed that the device does not actually print the record of the amount of liquid drawn off until the key is turned back to the position in which it can be withdrawn.

This device, as described, affords a means of keeping a check on the amount of liquid drawn by the drivers of the various wagons, and thus prevents losses by illegal sales made by dishonest drivers, or losses due to spilling of the liquids by careless handling, since each driver would, of course, be held responsible for the amount of liquid which is drawn off.

This device takes up little room and can be inclosed in a casing provided with a lock (not shown) which can be only opened by the proprietor or manager of the plant for the purpose of taking out the record strip and replacing it with a new one or for the adjustment of the various parts of the mechanism whenever such adjustment is necessary.

I claim:

1. In a liquid dispensing apparatus, a lock having a rotatable shaft, a lug slidable on said shaft and rotatable therewith, an arm carried by the lug, a key having a shoulder arranged to engage said arm for moving the lug longitudinally of the shaft, a type segment, and means operated by the movement of the lug for shifting the type segment.

2. In a liquid dispensing apparatus, a lock having a rotatable shaft, a lug slidable on said shaft and rotatable therewith, an arm carried by the lug, a key having a shoulder arranged to engage said arm for moving the lug longitudinally of the shaft, a type segment, means operated by the movement of the lug for shifting the type segment, said means comprising a lever for supporting the type segment, and a link pivotally connected with said lever and adapted to be moved by the lug when the latter is shifted.

3. In a liquid dispensing apparatus, a lock having a rotatable shaft, a lug slidable on said shaft and rotatable therewith, an arm carried by the lug, a key having a shoulder arranged to engage said arm for moving the lug longitudinally of the shaft, a type segment, means operated by the movement of the lug for shifting the type segment, said means comprising a lever for supporting the type segment, a link pivotally connected with said lever and adapted to be moved by the lug when the latter is shifted, and spring means for maintaining the link in constant engagement with the lug at all times.

4. In a liquid dispensing apparatus, a lock having a rotatable shaft, a lug slidable on said shaft and rotatable therewith, an arm carried by the lug, a key having a shoulder arranged to engage said arm for moving the lug longitudinally of the shaft, a type segment, means operated by the movement of the lug for shifting the type segment, said means comprising a lever for supporting the type segment, a link pivotally connected with said lever and adapted to be moved by the lug when the latter is shifted, spring means for maintaining the link in constant engagement with the lug at all times, a platen disposed in operative relation with said type segment, and means connected with the shaft for causing a movement of the platen toward the type segment.

5. In a liquid dispensing apparatus, a lock having a rotatable shaft, a lug slidable on said shaft and rotatable therewith, an arm carried by the lug, a key having a shoulder arranged to engage said arm for moving the lug longitudinally of the shaft, a type segment, means operated by the movement of the lug for shifting the type segment, said means comprising a lever for supporting the type segment, a link pivotally connected with said lever and adapted to be moved by the lug when the latter is shifted, spring means for maintaining the link in constant engagement with the lug at all times, a platen disposed in operative relation with said type segment, means connected with the shaft for causing a movement of the platen toward the type segment, said means comprising an arm rigidly connected to the shaft and rotatable therewith, a rod arranged to be engaged by said arm in its rotation, and a bell-crank lever secured to said platen and adapted to be actuated by the arm.

6. In a printing device, a plurality of type bearing members, a platen, an inking strip and a record strip disposed between the platen and the type bearing members, a lock, a key for operating the lock, means actuated by the key for causing the movement of the platen toward the type bearing members, said means comprising a rotatable cylinder having an arm, a slidable plate connected with said platen, and a link connected with said slidable plate and adapted to be engaged by said arm.

7. In a recording mechanism, a plurality of rolls, flexible strips carried by said rolls, a ratchet secured to one of said rolls, a locking mechanism having a rotatable member, a key for operating said rotatable member, a slidable bar arranged to be engaged by said rotatable member, one end of said slidable bar constituting a pawl and being normally in engagement with said ratchet, and a spring for restoring said bar to its normal position.

8. In a recording mechanism, a plurality of rolls, flexible strips carried by said rolls, a ratchet secured to one of said rolls, a locking mechanism having a rotatable member, a key for operating said rotatable member, a slidable rod arranged to be engaged by said rotatable member, one end of said slidable bar constituting a pawl and being normally in engagement with said ratchet, a spring for restoring said bar to its normal position, a receipt strip, a reel therefor, and connections between said ratchet and said reel for operating the latter.

9. In a liquid dispensing apparatus, a supply pipe, a meter mechanism connected therewith, a series of number wheels, means operated by the meter mechanism for turning said number wheels, said last named means comprising a crank arm carried by the meter, a vertically movable plate, pawls carried by the plate and arranged to engage the number wheels, a lever, and link connections between said arm and said vertically slidable plate.

10. In a liquid dispensing apparatus, a supply pipe, a meter mechanism connected therewith, a series of number wheels, means operated by the meter mechanism for turning said number wheels, said last named means comprising a crank arm carried by the meter, a vertically movable plate, pawls carried by the plate and arranged to engage the number wheels, a lever, link connections between said arm and said vertically slidable plate, and means for preventing the reverse movement of said number wheels during the operation of the pawls.

11. In a liquid dispensing apparatus, a supply pipe, a meter mechanism connected therewith, a series of number wheels, means operated by the meter mechanism for turning said number wheels, said last named means comprising a crank arm carried by the meter, a vertically movable plate, pawls carried by the plate and arranged to engage the number wheels, a lever, link connections between said arm and said vertically slidable plate, means for preventing the reverse movement of said number wheels during the operation of the pawls, means for simultaneously withdrawing said pawls and said stop members, and spring means for reversing the movement of said number wheels.

12. In a liquid dispensing apparatus, a supply pipe, a meter mechanism connected therewith, a series of number wheels, means operated by the meter mechanism for turning said number wheels, said last named means comprising a crank arm carried by the meter, a vertically movable plate, pawls carried by the plate and arranged to engage the number wheels, a lever, link connections between said arm and said vertically slidable plate, means for preventing the reverse movement of said number wheels during the operation of the pawls, means for simultaneously withdrawing said pawls and said stop members, spring means for reversing the movement of said number wheels, and spring-actuated stop members adapted to engage portions of said number wheels to limit the reverse movement of said number wheels.

13. In a liquid dispensing apparatus, a lock having a rotatable shaft, a lug slidable on said shaft, but rotatable therewith, an arm carried by the lug, a key having a shoulder arranged to engage said arm for moving the lug longitudinally of the shaft, a bar disposed parallel with said rotatable shaft, and a plurality of movable members carried by said parallel bar and adapted to be moved into and out of the path of the arm on said lug.

14. In a liquid dispensing apparatus, a lock having a rotatable shaft, a lug slidable on said shaft, but rotatable therewith, an arm carried by the lug, a key having a shoulder arranged to engage said arm for moving the lug longitudinally of the shaft, a bar disposed parallel with said rotatable shaft, a plurality of movable members carried by said parallel bar and adapted to be moved into and out of the path of the arm on said lug, and a cylinder rotatable around its own axis, the said parallel bar having a rigid connection with said cylinder at one end and having a loose connection with said shaft at the other.

15. In a liquid dispensing apparatus, a lock having a rotatable shaft, said shaft having a squared portion and a reduced cylindrical portion, a lug slidable on the squared portion of the shaft, but rotatable with the shaft, said lug having a laterally extending arm, a collar slidable on the squared portion of the shaft, a lever, a type segment carried by said lever on one side of the fulcrum, a link connecting said collar with the other end of the lever, a key having a shoulder arranged to engage the lug to force the latter longitudinally of the shaft, and a spring secured to the end of the lever and to a fixed portion of the dispensing apparatus for opposing the movement of the lug when the key is inserted.

RICHARD C. BRADLEY.

Witnesses:
 CAL D. HICKS,
 M. D. HALL.